United States Patent [19]

Tran

[11] Patent Number: 4,653,797
[45] Date of Patent: Mar. 31, 1987

[54] SUN SCREEN FOR INTERIOR OF AUTOMOTIVE VEHICLE WINDOW

[76] Inventor: Chang V. Tran, 328 "F" San Marcos, San Gabriel, Calif. 91770

[21] Appl. No.: 797,612

[22] Filed: Nov. 13, 1985

Related U.S. Application Data

[63] Continuation-in-part of Ser. No. 557,944, Dec. 5, 1983, abandoned.

[51] Int. Cl.$^4$ .............................................. E05B 65/04
[52] U.S. Cl. ................. 296/95 R; 296/97 R; 49/62; 49/67
[58] Field of Search ................. 296/97 R, 97 C, 97 F, 296/97 H, 97 K, 95 R, 95 C, 96, 97 A; 49/62, 67, 64, 55; 52/473

[56] References Cited

U.S. PATENT DOCUMENTS

| | | | |
|---|---|---|---|
| 2,115,935 | 5/1938 | Stinson | 49/67 |
| 2,349,470 | 5/1944 | Stanfield | 49/67 X |
| 2,776,461 | 1/1957 | Anderson | 49/64 X |
| 2,963,316 | 12/1960 | Matthews | 296/97 R |
| 3,113,357 | 12/1963 | Reukauf et al. | 52/573 X |
| 3,378,955 | 4/1968 | Wahlgren | 49/67 X |
| 4,023,309 | 5/1977 | Backward | 296/97 A X |
| 4,121,380 | 10/1978 | Lockshin | 296/95 R X |
| 4,232,483 | 11/1980 | Lockshin | 296/95 R X |
| 4,469,366 | 9/1984 | Deaver | 52/473 X |

OTHER PUBLICATIONS

Hitrix Motorized Blind advertisement; "Car & Driver" magazine, Oct. 1983.

Primary Examiner—Randolph Reese
Assistant Examiner—Russell D. Stormer
Attorney, Agent, or Firm—Charles H. Thomas

[57] ABSTRACT

A sun screen is provided for mounting inside of an automotive vehicle adjacent to the inner surface of a hatchback rear window thereof. The sun screen is formed of a support having longitudinal rails with upper and lower transverse bars secured to the rail extremities. The rails have longitudinally aligned transverse openings therethrough and a plurality of mutually parallel louvers are mounted on the longitudinal rails and pass through the openings therethrough for orientation in a horizontal disposition. Mounting hinges rotatably connect the support to the inner window frame for rotation about an axis proximate to and parallel to the upper transverse edge of the window frame. Mounting brackets proximate the lower edge of the window frame are formed as angles and include transverse legs which extend inwardly a short distance toward each other. The support is rotatable about the hinges so that the lower transverse bar can be brought into juxtaposition against the transverse legs of the mounting brackets, and secured thereto by means of threaded thumbscrews.

14 Claims, 8 Drawing Figures

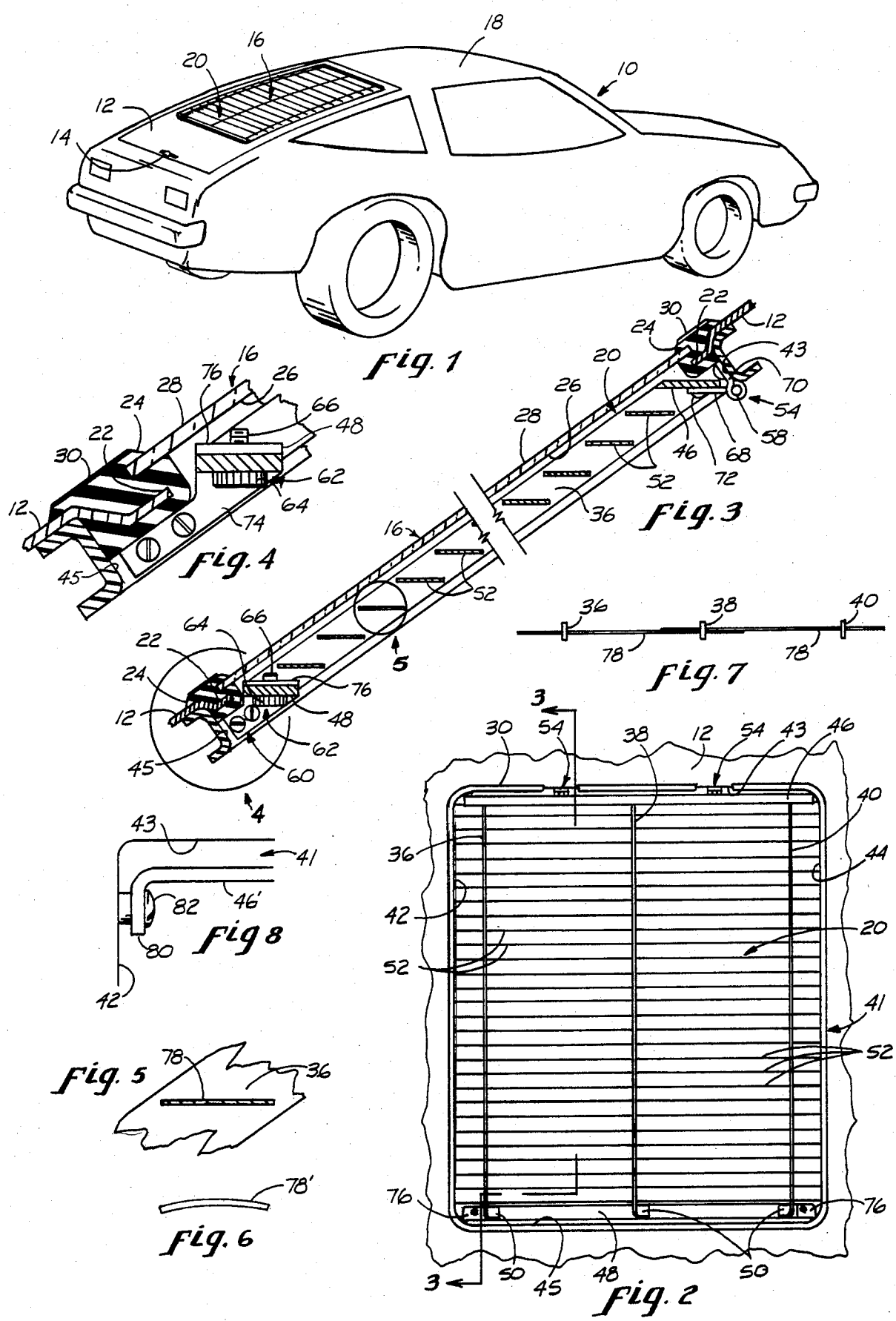

SUN SCREEN FOR INTERIOR OF AUTOMOTIVE VEHICLE WINDOW

The present application is a continuation-in-part of U.S. application Ser. No. 557,944, filed Dec. 5, 1983 now abandoned.

BACKGROUND OF THE INVENTION

1. Field Of The Invention

The present invention relates to sun screens which are used to provide protection from sunshine passing through the rear window of a hatchback automotive vehicle without obscuring visibility through the window.

2. Description Of The Prior Art

Various sun screens have been provided for mounting on the exterior of a window of an automotive vehicle to protect the upholstery and the occupants of the vehicle from direct sunshine passing through the window. Conventional sun screens are typically formed of stamped or assembled metal members which include a plurality of mutually parallel, horizontally disposed louvers that are joined together and secured to the window frame or exterior surface of the automotive vehicle body.

Sun screens are particularly desirable in automotive vehicles which have inclined rear windows. In many models of modern automobiles, the rear windows are inclined to form a relatively small angle with respect to the horizontal, as contrasted with the rear windows of automobiles manufactured in earlier years. Contemporary vehicles having inclined rear windows of this type are commonly referred to as "hatchback" model automobiles, due to the fact that the rear window is mounted in an upwardly rotatable lid that provides access to the vehicle trunk. The rear windows in conventional hatchback style vehicles are preferably inclined relative to the horizontal from between about 15 degrees to about 40 degrees. The inclination of a sloping rear window of a hatchback style automotive vehicle exposes the upholstery of the vehicle to rapid deterioration resulting from the visible and infra-red radiation which passes through the window. The extent of exposure to the sun is greatly enhanced when the normal orientation of a vehicle window is at a significant angular slope. In hatchback style vehicles windows are generally far more expansive in area than windows which are oriented in a generally upright disposition so as to provide the vehicle occupants with an adequate field of view. Due to the enhanced surface area and the angle of inclination of such a window, degradation of upholstery and discomfort to the vehicle occupants is a very significant problem. Furthermore, hatchback style vehicles having sloped or inclined windows have, in recent years, gained considerable popularity for a variety of reasons.

Conventional, externally mounted automobile vehicle window sun screens are constructed so as to adequately shield the interior of the vehicle from the sun and to afford the driver and the other vehicle occupants with good visibility. However, conventional, externally mounted vehicle window sun screens have several very significant disadvantages. When a sun screen is mounted on the exterior of an automotive vehicle window frame, it creates a considerable wind noise while the vehicle is traveling. The wind noise by itself is quite annoying to the driver and other occupants of the vehicle. Moreover, due in large part to the considerable buffeting of the sun screen by the wind, conventional devices tend to rattle quite loudly while the vehicle is under way. Conventional, externally mounted sun screens are generally constructed of a number of assembled metal parts. The manner of fabrication not only adds to the cost of such devices, but the parts tend to rattle together and against the surface of the vehicle window when the vehicle is in moton.

A further significant disadvantage of conventional vehicle window sun screens involves the aerodynamic drag which such externally mounted screens exert upon the vehicle. Such aerodynamic drag reduces the efficiency of vehicle fuel consumption, to some extent, and also contributes significantly to rattling and wind noise due to enhanced vibration of the component parts of the sun screen.

Another disadvantage of conventional vehicle window screens is that the framework and louvers are typically designed to fit only a single, specific vehicle model. The framework of conventional vehicle screens normally has a fixed, generally rectangular configuration which is suitable for mounting only upon a window of a particular size. Likewise, the louvers are of fixed length and extend the fixed distance between the edge rails of the framework. As a result, a particular sun screen has very little flexibility of application, and numerous different models of sun screens are necessary to accomodate the different models of hatchback vehicles available. A dealer in sun screens must therefore inventory an excessivly large stock in order to be able to accomodate a reasonable number of different vehicles. The cost of maintaining such a large inventory adds considerably to the cost of dealing in such devices. This cost, quite naturally, is passed along to the ultimate user.

SUMMARY OF THE INVENTION

In one aspect the present invention is a method of providing shade to the interior of an automotive vehicle having a window with inner and outer surfaces and with a rigid inner frame with opposite upper and lower transverse edges and opposite longitudinal edges extending therebetween. The method has applicability to hatchback vehicles in which the rear window slopes at an angle of between about 15 degrees and about 40 degrees relative to horizontal. The method of the invention involves securing to the rigid inner frame adjacent to the interior surface of the window a sun screen of a particular configuration. The sun screen utilized must have a support formed by longitudinal rails with a plurality of transverse openings defined therethrough and a pair of transverse bars secured to the opposite extremities of the longitudinal rails. A plurality of mutually parallel louvers are mounted on the longitudinal rails and pass through the openings therethrough. Also, hinges are secured to one of the transverse bars and mounting brackets are provided for releasable securement to the other of the transverse bars. The sun screen is secured to the rigid inner frame by fastening the hinges to the inner window frame at the upper transverse edge thereof. The mounting brackets are then secured to the inner window frame proximate to the lower transverse edge of the frame. The other transverse bar is then releasably secured to the mounting brackets remote from the upper transverse edge of the inner window frame. This releasably secures the sun screen with the longitudinal rails parallel to the window and to the longitudinal edges of the inner window frame and with the transverse bars parallel to the window and to the transverse edges of the inner window frame.

In another aspect, the invention is a sun screen for the inside of an automotive vehicle having inside and outside surfaces. Also, the vehicle window must have a rigid, inner window frame with opposing longitudinal and transverse edges, and must be oriented at an angle of between about 15 degrees and about 40 degrees relative to a horizontal plane. The sun screen includes a support which has longitudinal rails for orientation parallel to the inside surface of the window and to the opposing longitudinal edges of the interior window frame. The rails have a plurality of openings extending transversely therethrough. A pair of transverse bars are secured to the extremities of the longitudinal rails for orientation parallel to the transverse edges of the window frame. The support is provided with a plurality of mutually parallel louvers mounted on the longitudinal rails and passing through the openings therethrough for orientation in a horizontal disposition. Mounting hinges are connected to one of the transverse bars and are adapted for securement to the inner window frame proximate to one of the transverse edges thereof. This hinged attachment allows the support and the louvers to swing away from the inside surface of the window about an axis of rotation parallel to and proximate to one of the transverse edges of the inner window frame. Fastening means are provided and include brackets mounted on the inner window frame and located remote from the transverse edge of the inner window frame at which the hinged connections are located. Releasable fasteners releasably secure the bracket to the other, proximate transverse bar relative to the inner window frame.

Preferably, the sun screen is constructed so that the support and the louvers reside in spaced separation from the inner surface of the window. This ensures that the sun screen will not rattle against the window, although rattling will be reduced in any event since the interior sun screen of the invention is not subjected to the buffeting of the wind as the vehicle moves. The longitudinal rails of the sun screen of the invention are not located along the outer edges of the support, but rather are interiorly located so that the louvers extend through the rails and protrude laterally outwardly therefrom. Preferably, the louvers are each formed of a plurality of elongated slab like sections which slide one against another. When the slabs reside in mutual sliding contact, they are longitudinally reciprocal relative to each other. By moving the slabs to adjust the degree of overlapping contact, the lengths of the louvers can be adjusted for a particular vehicle. Thus, the sun screen of the invention may be installed on many different models of hatchback, automotive vehicles, as the width of the sun screen can be adjusted in accordance with the width of the rear window.

The invention has further flexibility in the manner of hinge attachment. In many hatchback automotive vehicles, leaf hinges are used and are formed by a pair of leaves joined at interlocking knuckles by a hinge pin extending through the interlocking knuckles. One leaf of each hinge is secured to the upper transverse bar of the support while the other leaf of the hinge is secured to the upper transverse edge of the inner window frame. In some hatchback automotive vehicles, however, the transverse upper edge of the window frame is of such a configuration that leaf hinges cannot be attached thereto. Accordingly, the transverse upper bar may be provided with end extensions which project longitudinally away from and perpendicular to the upper transverse edge of the inner window frame. These end extensions are located proximate and parallel to the portions of the longitudinal edges of the inner window frame adjacent to the upper transverse edge. Hinge pins extend through the end extensions and into the longitudinal edges of the inner window frame to define an axis of rotation of the support parallel to the transverse upper edge of the inner window frame. The same basic sun screen structure can thereby be used for both types of hinge installation.

A further advantageous feature of a preferred embodiment of the invention is the manner of louver securement in the openings in the longitudinal rails. Preferably, the louvers are comprised of elongated slabs of resilient material which are resiliently deformed across their widths for insertion into transverse openings of slot-like configuration in the rails. The slabs forming the louvers thereby act as leaf springs against the structures of the rails and are thereby held in the transverse openings by spring tension. As a result, the louvers and the rails do not require any adhesive or mechanical fasteners in order for the louvers to be held snugly within the transverse openings so that they do not rattle against the rails.

The invention may be described with greater clarity and particularity by reference to the accompanying drawings.

DESCRIPTION OF THE DRAWINGS

FIG. 1 illustrates a hatchback automotive vehicle having a sloped window with which the sun screen of the invention may be utilized.

FIG. 2 is an elevational view of the sun screen of the invention as viewed perpendicular to the plane of the hatchback lid of the vehicle of FIG. 1.

FIG. 3 is a sectional elevational view taken along the lines 3—3 of FIG. 2.

FIG. 4 is an elevational detail indicated at 4 in FIG. 3.

FIG. 5 is an elevational detail indicated at 5 in FIG. 3.

FIG. 6 is an end view of a louver prior to being resiliently deformed.

FIG. 7 is an elevational detail illustrating a preferred form of louver construction according to the invention.

FIG. 8 is a detail illustrating a modification of the sun screen depicted in FIG. 2.

DESCRIPTION OF THE METHOD AND EMBODIMENTS

FIG. 1 illustrates a typical automotive vehicle 10 of the popular "hatchback" design. The vehicle 10 includes a sloping, lift-up lid 12 for access to the trunk and rear passenger seating area therein. The lid 12 is released and lifted by a conventional push-button grip and release indicated at 14, and swings upwardly about conventional hinges (not visible) which attach the lid 12 to the body of the vehicle 10. These hinges are located between the upper edges of the inclined rear window 16 and the roof 18 of the vehicle. The rear window 16 is inclined at an angle of between about 15 degrees and about 40 degrees relative to horizontal.

The window 16 has inside and outside surfaces 26 and 28 respectively, best depicted in FIG. 3. The window 16 is mounted in an opening defined in the sheet metal hatchback lid 12. The edges of the sheet metal lid 12 are deformed slightly to define an accommodating lip 22 which extends around the entire, generally rectangular perimeter of the opening defined in the lid 12. The window 16 is seated and sealed in the opening in the lid 12 by means of a configured rubber gasket 24 which extends about the entire perimeter of the opening in the lid 12. The gasket 24 is exposed both on the inner surface 26 of the window 16, as well as on the external surface 28 thereof. A chrome plated finishing strip 30 is disposed atop the rubber gasket 24 throughout the circuit thereof on the outside of the lid 12. The finishing strip 30 is secured to the lid 12 by conventional fasteners, not shown. On the inside of the vehicle 10 there is a rigid, inner frame 41 bounding the perimeter of the window 16 in abutment against the exposed portion of the rubber gasket 22. The rigid, inner frame 41 is typically a metal or plastic structure and has parallel opposing longitudinal edges 42 and 44, a transverse upper edge 43, and a transverse lower edge 45.

In accordance with the invention, a sun screen 20, visible through the transparent window 16 in FIG. 1, is secured adjacent to the interior surface 26 of the window 16, as depicted in greater detail in FIG. 2, and as depicted in cross-section in FIG. 3. As illustrated in FIGS. 2 and 3, longitudinal rails 36, 38 and 40 extend parallel to the longitudinal window frame edges 42 and 44. The rails 36, 38 and 40 have a plurality of longitudinally aligned, narrow transverse slot-like openings extending therethrough. Upper and lower transverse bars 46 and 48, respectively, are secured to the extremities of the longitudinal rails 36, 38 and 40. Both ends of each of the rails 36, 38 and 40 are turned transversely inwardly to define mounting pads 50 which are secured by screws to the upper and lower transverse bars 46 and 48. A plurality of mutually parallel louvers 52 are mounted on the longitudinal rails 36, 38 and 40 and pass through the longitudinally aligned opening therein to extend transversely beyond the outermost rails 36 and 38. Mounting hinges 54 are connected to the upper transverse bar 46 and are adapted for securement to the window frame 41 at the upper transverse edge 43 thereof. The hinges 54 allow the support formed by the rails 36, 38 and 40, the lower transverse bar 48, and the louvers 52 to swing away from the interior surface 26 of the window 16 about an axis of rotation parallel to and proximate to the upper transverse edge 43 of the inner window frame 41. The axis of rotation is defined by the hinge pins 58 of the hinges 54. Mounting brackets 60 are adapted for securement to the window frame 41 remote from the upper transverse edge 43 and proximate to the lower transverse edge 45 thereof. Releasable fasteners in the form of thumbscrews 62 having knurled, disc-shaped heads 64 and threaded shanks 66 releasably secure the mounting brackets 60 to the lower transverse bar 48.

Hinges 54 are each formed of two leaves 68 and 70 which terminate in knuckles that are interlocked. The leaves 68 and 70 of each hinge 54 are rotatably connected together by hinge pins 58, which pass through the aligned knuckles. The leaf 68 is secured to the upper transverse bar 46 by screws 72, as depicted in FIG. 3. The other leaf 70 is secured by screws 72 to the upper transverse edge 43 of the inner window frame 41.

The mounting brackets 60 are formed as angles, each having a first leg 74 and a second leg 76, as depicted in detail in FIG. 4. The first legs 74 of the angle-shaped mounting brackets 60 are secured to the longitudinal edges 42 and 44 of the inner window frame 41. The legs 74 of the mounting brackets 60 are secured by screws 72 to the lower extremities of the longitudinal edges 42 and 44 of the inner window frame 41. The second legs 76 of the mounting brackets 60 extend transversely inwardly toward each other and parallel to the lower transverse bar 48. As illustrated in both FIGS. 3 and 4, the legs 76 are oriented in a horizontal disposition. When the sun screen 20 is rotated upwardly into its normal, installed position depicted in FIG. 3, and the thumbscrew fasteners 62 are engaged, the threaded shanks 66 of the thumbscrew fasteners 62 pass through openings in the lower transverse bar 48 and are threadably engaged in drilled and tapped bores through the legs 76 of the mounting brackets 60. The heads 64 of the thumbscrew fasteners 62 press upwardly and bear against the lower transverse bar 48 to force it upwardly and into contact with the legs 76 of the mounting brackets 60. The heads of the thumbscrew fastener 62 thereby hold the upper and lower transverse bars 46 and 48 in a horizontal disposition. The legs 76 of the mounting bracket 60, and the transverse bars 46 and 48 are thereby all horizontally disposed when the thumbscrew fasteners 62 are engaged in the legs 76 of the angle shaped mounting brackets 60.

Preferably, the louvers 52 are each comprised of a plurality of elongated, generally rectangular slabs 78, as best depicted in FIGS. 2 and 7. The slabs 78 slide one against another. In the embodiment depicted, each louver 52 is formed of two overlapping slabs 78 which reside in sliding contact with each other and which are longitudinally reciprocal relative to each other so that the lengths of the louvers 52 are adjustable. The elongated slabs 78 may thereby be longitudinally adjusted, one against another, to independently vary the overall length of each louver.

Preferably also, the slabs 74, in their undeformed stated, have a slight arcuate curvature across their widths, as depicted in FIG. 6. FIG. 6 is an end view of one of the lower slabs which is depicted in its undeformed state at 78'. As illustrates the slabs have a slight curvature across their widths. The transverse openings through the rails 36, 38 and 40, on the other hand, are not of arcuate configuration, but instead are narrow, linear slots. In order to insert the slabs 78 into the slots, therefore, it is necessary to resiliently deform the slabs 78 across their widths from the configuration depicted at 78' in FIG. 6 to the flat configuration depicted in FIG. 5. The slabs 78 can then slide through the narrow slots in the longitudinal rails 36, 38 and 40 for positioning to shield the interior of the vehicle from sun shining through the window 16. Preferably, the width of the slot-shaped openings in the central rail 38 are double the width of the openings in the rails 36 and 40, so that the openings in the central rail 38 accommodate the double thickness of the slabs 78 at the center of each louver 52. As is evident from FIG. 7, the degree of overlap of the slabs 78 determines the overall length of each louver 52 so that the lengths of the louvers 52 may be adjusted. The sun screen 20 is therefore adaptable to windows 16 of different width. Since the slabs 78 are resiliently deformed across their narrow widths, they act as leaf springs against the structures of the rails 36, 38, and 40, and are held in the transverse openings therethrough by spring tension.

The louvers 52 may be formed of plastic or thin sheet metal, such as aluminum, but preferably are formed of a non-metallic glass-like material sold as S-2 glass. Such material can be purchased from Precision Composites, Inc., located at 1745 South Maize Road, Wichita, Kans. 67209.

The sun screen 20 is hingedly rotatable about the hinge pins 58 so as to allow the support and the louvers 52 to swing away from the inside surface 26 of the window 16. The hinge pins 58 are aligned upon an axis of rotation which is parallel to the upper edge 43 of the inner window frame 41. In FIG. 2, the outer chrome strip 30 and the underlying gasket 24 lying therebeneath, along with the lip 22 of the lid 12 defining the window opening have been broken away at the positions f the mounting hinges 54 to allow illustration of those hinges.

When the hatchback lid 12 is raised by means of the handle 14, the thumbscrew fasteners 62 can be loosened to disengage the shanks 66 thereof from the legs 76 of the mounting brackets 60. Thereupon, the sun screen 20 can be swung downwardly in a counterclockwise direction, as illustrated in FIG. 3, away from the inner surface 26 of the window 16 toward the interior of the vehicle 10. When the sun screen 20 is rotated downwardly away from the window 16 in this fashion, the inner surface 26 of the window 16 can be easily cleaned. In this connection it is significant to note that the outer surface 28 of the window 16 requires cleaning far more frequently than the inner surface 26. By mounting the sun screen 20 adjacent to the inner surface 26 of the window 16, the outer surface 28 of the window 16 is always accessible to be cleaned.

In some hatchback vehicles the upper, transverse edge of the inner window frame is of a configuration which does not accomodate attachment of leaves 70 of leaf hinges 54. Accordingly, in order for the same basic sun screen to be utilized with such vehicles, it is necessary to provide a different form of hinge connection. FIG. 8 illustrates one such modification of the sun screen of the invention. In FIG. 8 a transverse upper bar 46' is formed with longitudinally turned feet 80 at both of its opposite extremities. The feet 80 are directed longitudinally toward the other transverse bar 48 and are oriented parallel to the longitudinal edges 42 and 44 and perpendicular to the upper transverse edge 43 of the inner window frame 41. Linear hinge pins 82 have shanks which extend parallel to the upper transverse bar 46' through the feet 80 thereof and into the longitudinal edges 42 and 44 of the inner window frame 41. The hinge connection depicted in FIG. 8 does not require any hinge connection to the upper transverse edge 43, but still provides a form of mounting hinge adapted for securement to the inner window frame 41 proximate to the upper transverse edge 43 thereof. As in the manner depicted in association with FIG. 3, the sun screen can still be swung away from the inside surface 26 of the window 16 about an axis of rotation parallel to and proximate to the upper transverse edge 43 of the inner window frame 41.

In addition to the advantages of the invention hereinbefore set forth, both of the embodiments of the invention described have the further advantage of a very significant reduction in weight as contrasted with conventional, externally mounted sun screens. Because the sun screen of the invention is mounted on the inside of the window 16, it is not subjected to the same physical punishment and effects from the exterior environment as conventional, externally mounted sun screens. Accordingly, the sun screen of the invention need not be constructed of heavy gauge metal and can be constructed in the unique manner described herein. Consequently, the weight of the sun screen of the invention is only a fraction of that of conventional sun screens. While conventional, externally mounted sun screens weigh on the order of twenty pounds, a sun screen manufactured as illustrated and described weighs less than five pounds.

Undoubtedly, numerous other variations and modifications of the invention will become readily apparent to those familiar with automotive vehicle accessories. Accordingly, the scope of the invention should not be construed as limited to the specific embodiment of the invention depicted and the specific implementation of the method of the invention described, but rather is defined in the claims appended hereto.

I claim:

1. A sun screen for the inside of an automotive vehicle window having inside and outside surfaces which has a rigid, inner window frame with opposing longitudinal and transverse edges and oriented at an angle of between about 15 degrees and about 40 degrees relative to a horizontal plane comprising:

a support having longitudinal rails for orientation parallel to said inside surface of said window and to said opposing longitudinal edges of said inner window frame and having a plurality of openings extending transversely therethrough, and a pair of transverse bars secured to the extremities of said longitudinal rails for orientation parallel to said transverse edges of said window frame, a plurality of mutually parallel louvers resiliently deformed across their widths for insertion through said openings in said rails, and said louvers are mounted on said longitudinal rails and are held within said openings in a horizontal disposition by their resilient spring action against the structure of said rails, mounting hinges connected to one of said transverse bars and adapted for securement to said inner window frame proximate to one of said transverse edges thereof to allow said support and said louvers to swing away from said inside surface of said window about an axis of rotation parallel to and proximate to one of said transverse edges of said inner window frame, and fastening means including brackets mounted on said inner window frame and located remote from said one transverse edge of said inner window frame wherein said brackets are angles having first and second legs, and said first legs of said angles are secured to said longitudinal edges of said inner window frame and said second legs of said angles are drilled and tapped and extend transversely toward each other, and releasable fasteners in the form of thumbscrews with threaded shanks threadably engageable in said second legs of said angles which releasably secure said brackets to said other of said transverse bars relative to said inner window frame, whereby said second legs are parallel to said other transverse bar and are in contact therewith when said releaseable fasteners are secured to said brackets.

2. A sun screen according to claim 1 in which said one of said transverse bars is an upper bar and said other of said transverse bars is a lower bar, and said mounting hinges each have two leafs, one of which is secured to said upper bar and the other of which is secured to said one transverse edge of said inner window frame.

3. A sun screen according to claim 1 in which said mounting hinges are formed by feet at the extremities of said one transverse bar directed longitudinally toward said other transverse bar, and by hinge pins extending parallel to said one transverse bar through said feet into said longitudinal edges of said inner window frame.

4. A sun screen according to claim 1 in which said second legs of said angles and said transverse bars are all horizontally disposed when said thumbscrews are engaged in said second legs of said angles.

5. A sun screen according to claim 1 in which each of said louvers is comprised of a plurality of elongated slabs which slide one against another, whereby said slabs of each louver are longitudinally adjustable relative to each other to independently vary the overall louver length.

6. A sun screen for the inside of an automotive vehicle window having inner and outer surfaces and having a rigid, inner window frame with opposite longitudinal edges and upper and lower transverse edges and inclined at an angle of between about 15 degrees and about 40 degrees relative to horizontal comprising: longitudinal rails extending paralllel to said longitudinal window frame edges and having a plurality of longitudinally aligned, transverse openings extending therethrough, upper and lower transverse bars secured to the extremities of said longitudinal rails and disposed parallel to said upper and lower transverse edges of saaid window frame, a plurality of mutually parallel louvers comprised of elongated slabs of resilient material which are resiliently deformed across their widths and pass through said transverse openings in said rails, whereby said slabs act as leaf springs against the structures of said rails and said louvers are held in said transverse openings by spring tension, mounting hinges connected to said upper transverse bar and adapted for securement to said window frame at said upper transverse edge thereof to allow said rails, said lower transverse bar and said louvers to swing away from said inner surface of said window about an axis of rotation parallel to and proximate to said upper transverse edge of said window frame, mounting brackets formed as angles having first and second legs and adapted for securement to said window frame remote from said upper transverse edge thereof and proximate to said lower transverse edge thereof, with said first legs secured to said longitudinal edges of said inner window frame and said second legs of said angles are drilled and tapped and extend transversely toward each other and releasable fasteners in the form of thumbscrews with threaded shanks threadably engageable in said second legs of said angles for releasably securing said mounting brackets to said lower transverse bar to hold said transverse bar parallel to and in contact with said second legs of said angles.

7. A sun screen according to claim 6 wherein said mounting bràckets are formed as angles, each having a first leg secured to one of said opposite longitudinal edge of said inner window frame and each having a second leg projecting inwardly toward the opposite longitudinal edge and parallel and proximate to said lower transverse edge of said inner window frame and said lower transverse bar resides in contact with said second legs when said fasteners secure said mounting brackets to said lower transverse bar.

8. A sun screen according to claim 6 wherein said second legs of said mounting brackets and said lower transverse bar are horizontally disposed when said fasteners secure said mounting brackets to said lower transverse bar.

9. A sun screen according to claim 6 in which said mounting hinges are comprised of leaves joined at knuckles each mounting hinge having one leaf permanently attached to said upper transverse bar and another leaf permanently attached to said upper transverse edge of said inner window frame.

10. A sun screen according to claim 6 in which said mounting hinges are comprised of end extensions from said upper transverse bar projecting longitudinally away from and perpendicular to said upper transverse edge of said inner window frame, and hinge pins extending through said end extensions and into said longitudinal edges of said inner window frame proximate to said upper transverse edge thereof.

11. A sun screen according to claim 6 in which saiïd louvers are comprised of elongated slabs of resilient material which are resiliently deformed across their widths for insertion into said transverse openings in said rails, whereby said slabs act as leaf springs against the structures of said rails and said louvers are held in said transverse openings by spring tension.

12. A sun screen according to claim 11 in which each louver is comprised of a plurality of overlapping slabs which reside in sliding contact with each and are longitudinally reciprocal relative to each other so that the lengths of said louvers are adjustable.

13. A method of providing shade to the interior of an automotive vehicle having a rear window with inner and outer surfaces and with a rigid, inner frame with opposite upper and lower transverse edges and opposite longitudinal edges extending therebetween and sloping at an angle of between about 15 degrees and about 40 degrees relative to horizontal, comprising: securing to said rigid inner frame adjacent to said interior surface of said window a sun screen having a support formed by longitudinal rails with a plurality of transverse openings defined therethrough and a pair of transverse bars secured to the opposite extremities of said longitudinal rails, a plurality of mutually parallel louvers mounted on said longitudinal rails and passing through said openings therethrough, hinges secured to one of said transverse bars, and mounting brackets for releasable securement to the other of said transverse bars, wherein said mounting brackets are angles having first and second legs, and said second legs of said angles are drilled and tapped to receive releaseable fasteners in the form of thumbscrews with threaded shanks, by resiliently deforming said louvers across their widths and inserting said louvers into said rails and through said transverse openings, whereby said louvers are held within said openings by their resilient spring action against the structure of said rails, fastening said hinges to said inner window frame at said upper transverse edge thereof, seccuring said mounting brackets to said inner window framee proximate to said lower transverse edge thereof so that and said first legs of said angles are secured to said longitudinal edges of said inner frame and said second legs of said angles extend transversely toward each other, and releasably securing said lower transverse bar to said mounting brackets remote from said upper transverse edge of said inner window frame by inserting the shanks of said thumbscrews through said lower transverse bar and engaging said shanks in said second legs, of said angles to hold said lower transverse bar parallel to and in contact with said second legs, thereby releasably securing said sun screen with said longitudinal rails parallel to said window and to said longitudinal edges of said inner window frame and with said transverse bars parallel to said window and to said transverse edges of said inner window frame.

14. A method according to claim 13 further comprising mounting said sun screen so that said support and said louvers reside in spaced separation from said inner surface of said window.

* * * * *